United States Patent [19]

Meli

[11] Patent Number: 5,956,319
[45] Date of Patent: Sep. 21, 1999

[54] NODE IN AN OPTICAL SIGNAL TRANSMISSION NETWORK, AND METHOD OF RETAINING THE COMMUNICATION ON THE OCCURRENCE OF A FAILURE

[75] Inventor: Fausto Meli, Piacenza, Italy

[73] Assignee: Pirelli Cavi S.p.A., Milan, Italy

[21] Appl. No.: 08/790,573

[22] Filed: Jan. 29, 1997

[30] Foreign Application Priority Data

Feb. 5, 1996 [IT] Italy ................................. MI96A0199

[51] Int. Cl.⁶ ..................................................... H04K 1/22
[52] U.S. Cl. ............................................................ 370/224
[58] Field of Search .................................... 370/222, 223, 370/224, 219, 220, 227, 228; 358/119, 128, 166; 340/825.01, 827

[56] References Cited

U.S. PATENT DOCUMENTS

| | | | |
|---|---|---|---|
| 4,538,026 | 8/1985 | Yasue ....................................... | 370/224 |
| 4,704,714 | 11/1987 | Tomizawa et al. ...................... | 370/224 |
| 5,159,595 | 10/1992 | Flanagan et al. ........................ | 370/224 |
| 5,179,548 | 1/1993 | Sandaesara .............................. | 370/222 |
| 5,442,623 | 8/1995 | Wu ........................................... | 370/224 |

OTHER PUBLICATIONS

M. Guizani et al., "Optical Design of a Fault Tolerant Self–Routing Switch for Massively Parallel Processing Networks", IEEE, pp. 246–254, (1995).

A.F. Elrefaie, "Multiwavelength Survivable Ring Network Architectures", IEEE Technical Program, Conference Record, 2/3:1245–1251 (1993).

E. Gay et al., Theoretical Simulation and Experimental Investigation on a WDM Survivable Unidirectional Open Ring Network Using Tunable Channel Selecting Receivers, Journal of Lightwave Technology, 13(8):1636–1647 (1995).

*Primary Examiner*—Chau Nguyen
*Assistant Examiner*—Kenneth Vanderpuye
*Attorney, Agent, or Firm*—Finnegan, Henderson, Farabow, Garrett & Dunner, L.L.P.

[57] ABSTRACT

The optical node comprises two working directional switches (22,27) connected serially in a primary ring line (2), respectively ahead of and after an extracting and/or inserting unit (11), and further connected serially in a secondary ring line (3), which are adapted to controllably switch the optical signal path between the primary ring line (2) and the secondary ring line (3), and to the extracting and/or inserting unit (11). The node further comprises two backup directional switches associated with the working directional switches and connected operatively in the primary (2) and secondary (3) ring lines to restore the optical node (10) to proper operation on the occurrence of a failure at the working directional switches.

9 Claims, 3 Drawing Sheets

NODE IN AN OPTICAL SIGNAL TRANSMISSION NETWORK, AND METHOD OF RETAINING THE COMMUNICATION ON THE OCCURRENCE OF A FAILURE

DESCRIPTION

This invention relates to an optical node for a ring layout, optical signal transmission network, i.e. to an assembly of optical components which are arranged to allow of the extraction and insertion of signals related to one or more transmission channels from/into the ring. In fact, different channel signals having different wavelengths travel jointly over optical fibers in the network; signal components which have a corresponding wavelength to a given channel are picked up for insertion into the network at the nodes.

The amount of information exchanged on optical signal transmission networks is quite large. For this reason, a failure there may be of serious consequence, by letting a very large number of users segregated from the flow of information.

One typical failure is an interruption in an optical fiber, for example because the fiber has been cut unintentionally by some operator unaware of its presence. In order to cope with such an occurrence in an automatic and adequately prompt manner to avoid any significant break in the flow of information, self-healing double ring networks have been developed. A network of this kind is shown schematically in FIGS. 3 and 4.

In such networks, the various nodes are interconnected by two ring lines of optical fibers, namely: a primary ring line (also referred to as the outer ring) and a secondary ring line (also referred to as the inner ring). Under normal conditions, signals would travel the primary line unidirectionally, and be extracted and/or inserted from/into the various nodes according to their wavelengths.

In the event of an optical fiber in the primary line becoming interrupted between an upstream node and a downstream node, it is restored by having the signal stream diverted from the primary line to the secondary line at the node ahead of the interruption (relative to the direction of propagation of the signals through the primary line), and from the secondary line to the primary line at the node after the interruption. The signals propagate through the secondary line in the opposite direction from the primary line.

To arrange for such diversions to occur from one line to the other in an automatic manner, self-healing nodes are provided with so-called directional switches, which are four-way optical components having two inputs and two outputs; in a normal configuration, the first output would be connected optically to the first input, and the second output connected optically to the second input, whereas in a switched configuration, the first output would be connected optically to the second input and the second output to the first input.

A node of this type is described, for example by S. Merli, A. Mariconda, R. De Sanctis in an article, "Analisi e dimensionamento di un anello ottico trasparente . . . ", Minutes of FOTONICA '95 Conference, Sorrento, May 1995, and shown schematically in FIG. 1. It provides for the signals to be switched to the secondary ring line on the occurrence of an interruption in the primary ring line; in addition, it allows an optical user of the node (typically, a wavelength-selecting optical switch for extracting and inserting signals of a channel having a predetermined wavelength) to be bypassed in the event of the failure occurring at the user itself, thereby safeguarding the transmission between the remaining nodes in the network.

It is observed, however, that on the occurrence of a failure in the optical fiber of the primary ring line, the directional switch that should be operated to divert the signals to the secondary ring line may occasionally prove defective itself, and be unable to perform its function, either in that it can no longer change over or even because, in attempting the changeover, it becomes so damaged that no signals can be passed therethrough. Although a most unlikely occurrence, this can be of very serious consequence because the whole network would then be put out of use.

Thus, the problem exists of preventing the network from collapsing entirely on the simultaneous occurrence of a failure in the optical fiber of the primary ring line and in any one of the directional switches.

Accordingly, a first aspect of the present invention relates to an optical node in an optical signal transmission network of the self-healing ring type, wherein the ring comprises at least one primary ring line through which optical signals are propagated in a predetermined direction in the normal condition of operation and a secondary ring line through which the optical signals are propagated in the opposite direction upon the occurrence of a failure, comprising:

a unit for extracting and/or inserting an optical signal from/into the primary ring line, with the unit connected serially in said line;

first and second working directional switches connected serially in the primary ring line, respectively ahead of and after the extracting and/or inserting unit with respect to the direction of propagation of the optical signals through the primary ring line, and further connected serially in the secondary ring line, said switches being effective to controllably switch the optical signals between the primary ring line and the secondary ring line as well as to the extracting and/or inserting unit;

characterized in that it comprises first and second backup directional switches being respectively associated with the first and second working directional switches, and operatively connected in the primary and secondary ring lines to restore the optical node to proper operation on the occurrence of a failure at the first and second working directional switches.

In this way, should any one of the working directional switches develop problems at the time of its operation, a respective backup directional switch can be brought to operate in its place.

Preferably, the first and second backup directional switches are respectively connected after the first working directional switch and ahead of the second working directional switch along the primary ring line, and respectively connected ahead of the first working directional switch and after the second working directional switch along the secondary ring line.

This arrangement allows the backup switch to flank the working switch without any additional optical diverting devices being required to have the signals re-routed toward the backup switch on the occurrence of a failure in the working switch. In fact, and as more fully explained in the description to follow, in case of a malfunction in a working switch, the line operability would be retained by simply having the corresponding backup switch take over. This will inhibit the passage of line signals through the faulty switch, so that the latter can be replaced on first opportunity without the transmission of signals within the network suffering interruptions.

Still more preferably, the primary ring line includes at the node:

a node input fiber connected to a first input of the first working directional switch, a first connection fiber connecting a first output of the first working directional switch to a first input of the first backup directional switch, a second connection fiber connecting a first output of the first backup directional switch to a main input of the extracting and/or inserting unit, a third connection fiber connecting a main output of the extracting and/or inserting unit to a first input of the second backup directional switch, a fourth connection fiber connecting a first output of the second backup directional switch to a first input of the second working directional switch, and a node output fiber connected to a first output of the second working directional switch;

the secondary ring line includes at the node:

a node input fiber connected to a second input of the first backup directional switch, a fifth connection fiber connecting a second output of the first backup directional switch to a second input of the first working directional switch, a sixth connection fiber connecting a second output of the first working directional switch to a second input of the second working directional switch, a seventh connection fiber connecting a second output of the second working directional switch to a second input of the second backup directional switch, and a node output fiber connected to a second output of the second backup directional switch.

A second aspect of the invention relates to a method of retaining, on the occurrence of a failure, the communication of optical signals within a self-healing ring type of optical transmission network having at least two insertion and/or extraction nodes controlled by optical signals, and two ring lines connecting said nodes, namely a primary ring line through which the optical signals propagate in a predetermined direction and a secondary ring line through which the optical signals would propagate in the opposite direction on the occurrence of a failure, the method comprising the following steps to be carried out in the event of the communication being interrupted at an identified site along the primary ring line:

switching the signals, at the downstream node from the interruption site with respect to the direction of propagation of the signals through the primary ring line, to re-route them from the secondary ring line to the primary ring line using a first working directional switch at the node input;

switching the signals, at the upstream node of the interruption site with respect to the direction of propagation of the signals through the primary ring line, to re-route them from the primary ring line to the secondary ring line using a second working directional switch at the node output;

characterized in that, in the event of a further failure occurring at any one of the working switches, the following step is carried out:

re-routing the signals directed to the faulty working directional switch from the ring line through which they were propagating, to the other ring line.

In this way, the faulty directional switch can be cut off to the signals.

Further features and advantages of the invention will be more clearly apparent from the following description, to be read in conjunction with the accompanying drawings, in which.

Figure 3:
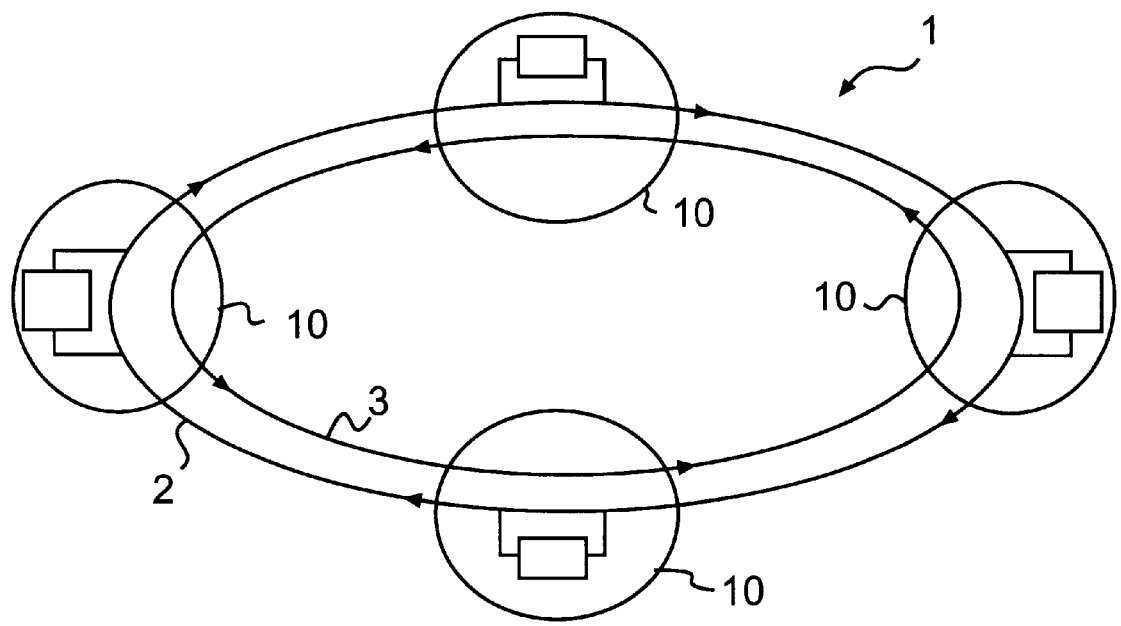
FIGS. 3 and 4 show schematically a network of the self-healing ring type during normal operation and on an interruption occurring in the primary ring line.
Figure 4:
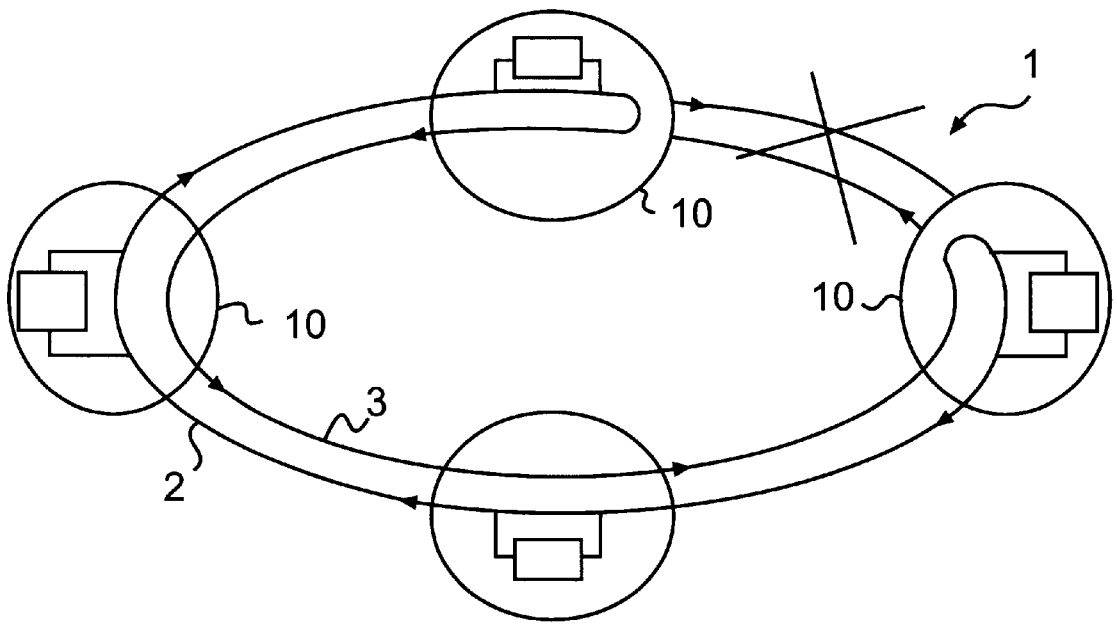

The self-healing ring network 1 depicted in FIGS. 3 and 4 comprises nodes 10 for controllably inserting and/or extracting optical signals, and two ring lines which connect the nodes 10, namely: a primary ring line 2 and a secondary ring line 3. Optical signals are normally caused to travel over line 2 in a predetermined direction, whereas optical signals are only passed through line 3 in a situation of faulty network (to be explained) and in an opposite direction from that through line 2.

Figures 1, 2:
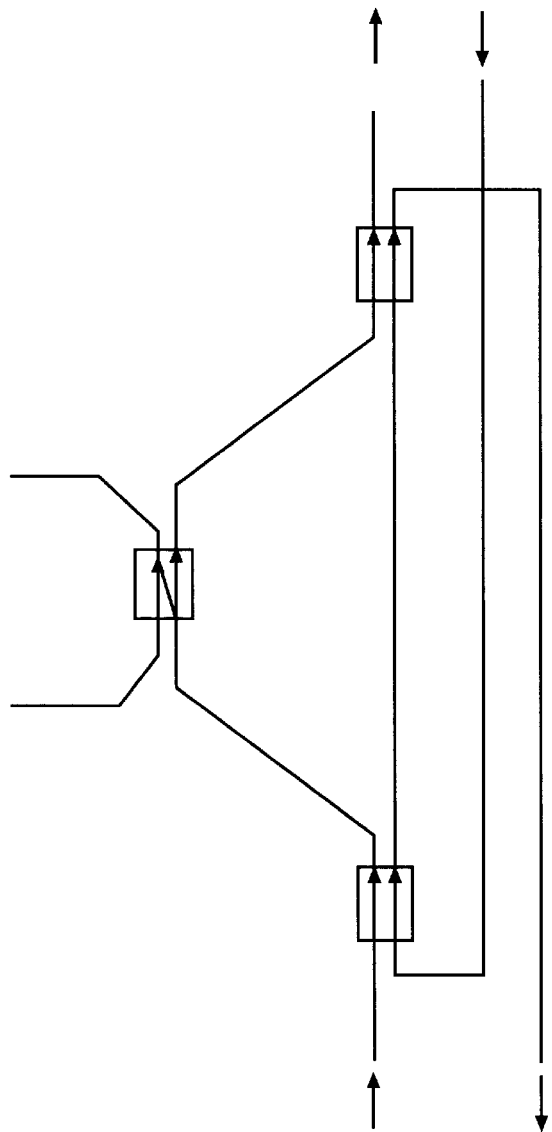
FIG. 1 shows a so-called self-healing optical node according to the prior art.
FIG. 2 shows an optical node according to the invention.

The node 10 shown in FIG. 2 includes a signal extraction and/or insertion unit consisting of a wavelength-selecting optical switch 11 which has a main input 12 for incoming optical signals, a main output 13 for outgoing optical signals, a local input 14 for the insertion of a specific optical signal having a predetermined wavelength, and a local output 15 for the extraction of a specific optical signal having the same predetermined wavelength. The wavelength-selecting optical switch 11 allows those components of the optical signals which have a different wavelength from the predetermined wavelength to go unrestrictedly through the switch 11, from the main input 12 to the main output 13 thereof, whereas those components of the optical signals which have the same wavelength as the predetermined wavelength are exchanged, out and in, through the local output 15 and input 14. The wavelength-selecting optical switch 11 may be of the acousto-optical type, for example.

Known are integrated acousto-optical devices whose operation is based on the interaction between light signals, being propagated through waveguides formed on a substrate of a birefractive photoelastic material, and sound waves being propagated at the substrate surface, as generated by means of specific transducers. The interaction of a polarized optical signal with a sound wave results in the signal polarization being converted, that is in the polarization of its mutually orthogonal components TE (Transverse Electric) and TM (Transverse Magnetic) being rotated.

With such acousto-optical devices, the spectral response curve can be tuned by controlling the frequency of the sound waves, which makes the devices suitable for use as switches in wavelength-division multiplexed, optical telecommunication networks. These devices allow the signal selection to be modified without altering the component wiring; also, they allow several signals or channels to be switched and selected simultaneously, if the sound wave travelling the substrate surface results from the superposition of different sound waves. In fact, the switches perform a combined changeover of signals at corresponding wavelengths to the frequencies being simultaneously applied to the electrodes of the electro-acoustical transducers.

When a channel having a given wavelength is selected, the optical signals of that same wavelength incoming through one input are addressed to the corresponding cross-state output, and those incoming through the other input are addressed to the corresponding other cross-state output (switch in its cross state). The unselected signals are addressed from one input to the corresponding bar-state output (straight-through transmission or switch in its bar state).

Figure 5:
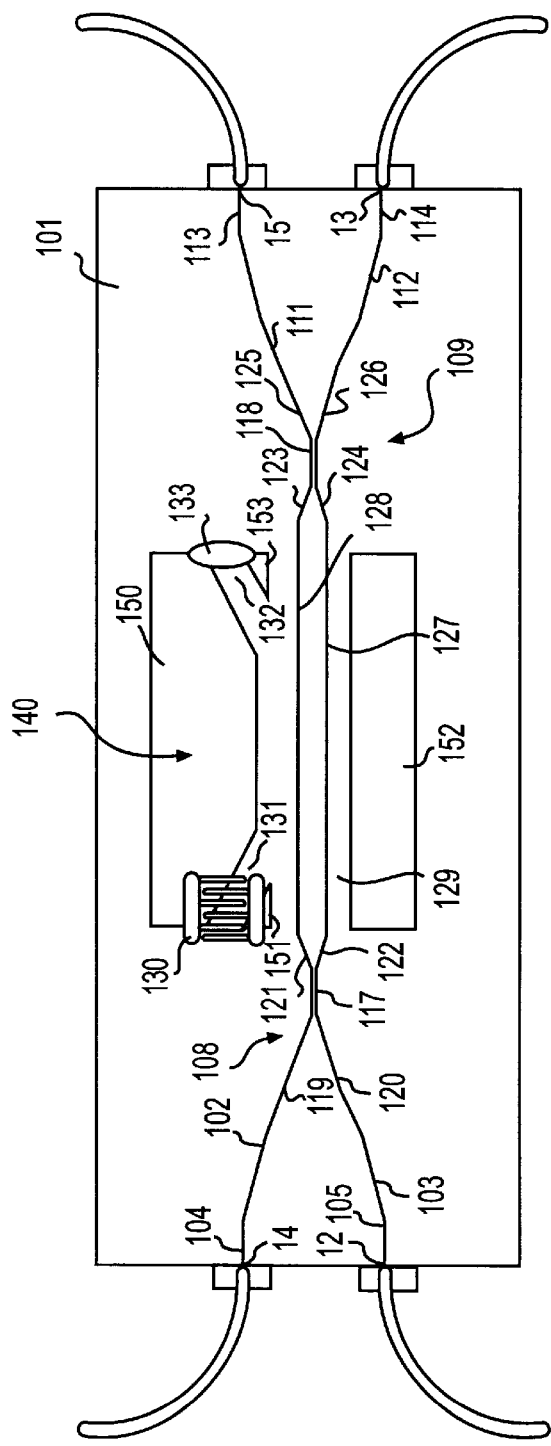
FIG. 5 shows schematically, in greater detail, a component of the optical node in FIG. 2.

A preferred embodiment of an acousto-optical switch 11 is depicted in FIG. 5.

The switch comprises a substrate 101 made of a birefractive photoelastic material of lithium niobate (LiNbO$_3$).

Formed in the substrate 101 are two optical waveguide input legs 102 and 103 whose ends 104 and 105 have two input ports 12, 14 thereon for the attachment of respective optical connection fibers through known connection devices (pigtailing), as shown schematically in the figure.

To allow of the attachment to said optical fibers (which are approximately 250 microns in diameter) outside the switch 11, the ports 12 and 14 are placed at least 125 microns apart.

Also formed in the substrate 101 are two polarizationselecting elements 108 and 109, a conversion stage 110, and two optical waveguide output legs 111 and 112, having on their ends 113, 114 respective output ports 15, 13 whereto respective optical output fibers are attached.

The polarization-selecting elements 108 and 109 are, preferably, polarization splitters formed by fading-wave directional couplers respectively adapted to split, between two output waveguides, two respective polarizations being fed to a common input, and to merge, into a common output waveguide, two respective polarizations being fed to waveguides with separate inputs; in particular, they comprise each a center optical waveguide 117 and 118, respectively, and input and output waveguide pairs 119, 120, 121, 122 and 123, 124, 125, 126, respectively.

The conversion stage 110 comprises two parallel optical waveguide legs 127, 128 connected to the output guide pair 121, 122 of polarization splitter 108 and the input waveguide pair 123, 124 of polarization splitter 109; it further comprises an acoustical waveguide 129, containing the waveguide legs 127, 128 and an electro-acoustical transducer 130 formed of a pair of interdigited electrodes and adapted to generate an RF surface acoustical wave.

Expediently, the transducer 130 is placed in an acoustical waveguide 131, in communication with the acoustical waveguide 129, to form an acoustical coupler therewith.

Provided on the end of a further acoustical waveguide 132, adapted to receive the sound signal from the acoustical guide 129, is an acoustical absorber 133. The acoustical waveguides 129, 131 and 132 are bound by regions 150, 151, 152, 153 where the substrate has been doped to provide for a higher velocity of acoustical wave propagation than through the guides 129, 131 and 132, thereby confining the sound signal to within the guides.

The assembly of the electro-acoustical transducer 130, the acoustical waveguides 129, 131, 132 and the optical waveguides contained in the acoustical guide 129 form an acousto-optical converter 140 which provides for the interaction of the sound wave with the optical signals.

The switch shown in FIG. 5 operates as follows.

When no voltage is applied to the electro-acoustical transducer 130, the switch is in its off state and in a condition of straight-through transmission (bar-state) wherein a direct correspondence is established between the input ports 12, 14 and the output ports 13, 15, respectively.

The light signals enter through the ports 12, 14 and into the polarization splitter 108, where the polarization components TE and TM are split between the waveguides 121 and 122, travel unchanged through the legs 127 and 128 of the conversion stage 110, and are delivered into the polarization splitter 109, where the polarization components are re-combined such that the incoming signals through the ports 12 and 14 will go out unchanged through the ports 13 and 15.

By applying an appropriate switch signal to the electrodes of the transducer 130, the switch can be put in its on state to pass in a cross state for the selected wavelengths, with the input ports 12 and 14 aligned to the cross output ports 15 and 13, respectively.

For the purpose, the transducer 130 will generate an RF surface sound wave at acoustical drive frequencies $f_{ac}$ (approximately 174±10 MHz for devices operated in the 1550 nm range, and 210±10 MHz for devices operated in the 1300 nm range) corresponding to the optical resonance wavelengths at which the polarization conversion TE->TM or TM->TE takes place for one or more predetermined signal wavelengths requiring to be switched.

The light signals enter the polarization splitter 108, where the polarization components TE and TM are split and directed through the legs 127 and 128 of the conversion stage 110 in which the components of signals having said predetermined wavelengths are converted to their orthogonal components.

The polarization components TE and TM are then delivered into the polarization splitter 109 so that the selected polarization components from the input port 12 will exit through the output port 15 along with the unselected components from the port 14, and the selected polarization components from the input port 14 will exit through the output port 13 along with the unselected components from the port 12.

Thus, those signals which have been subjected to a polarization conversion within the conversion stage 110 will be guided fully in a cross state, thereby producing a full changeover function, whereas those signals which have not interacted with the sound wave go through unaltered.

Figure 6:
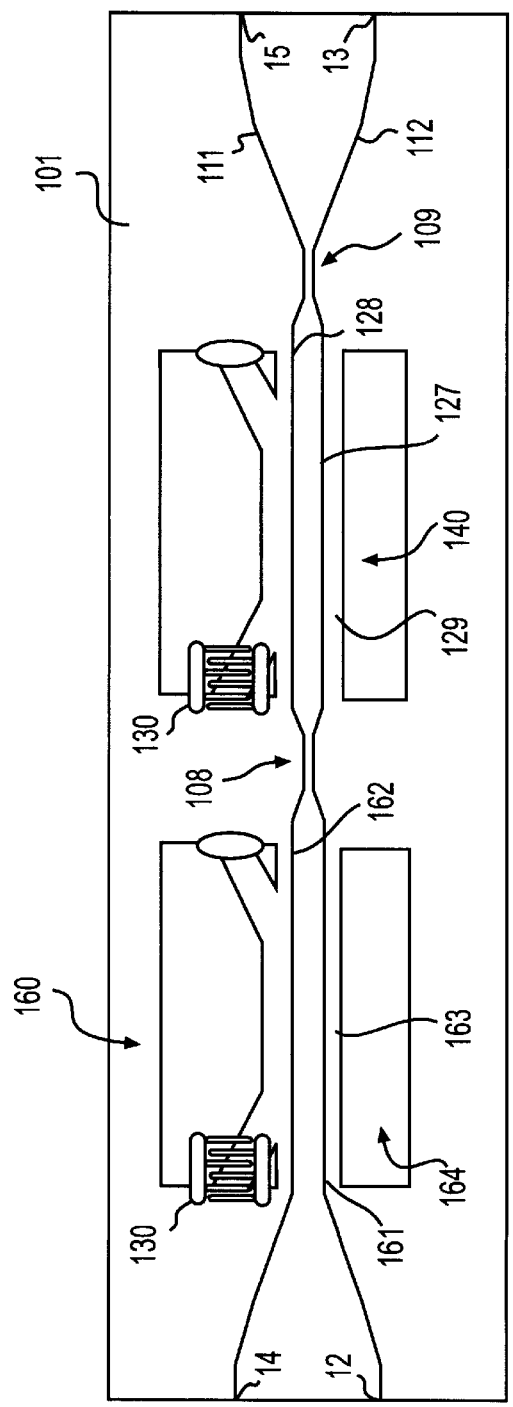
FIG. 6 shows schematically, in greater detail, a component of the optical node in FIG. 2 according to another embodiment of the invention.

In a particular embodiment shown in FIG. 6, a compensation stage 160 is also formed in the substrate 101 which comprises two parallel optical waveguide legs 161 and 162 attached with one end to the input ports 14, 12 and with the other end to the legs 119, 120 of the polarization splitter 117.

The two optical waveguide legs 161 and 162 are contained within the acoustical waveguide 129 of an acoustcooptical converter 164, having a similar construction to that of the previously described converter 140 and its components denoted by the same references. In this embodiment, the input signals, with the polarization components TE and TM combined together, travel through the legs 161 and 162 of the compensation stage 160 and, with the converter 160 in the on state, are converted to their orthogonal components, while still combined together.

The signals enter then the conversion stage 110, where the polarization components TE and TM are converted back to their original polarized state by the acousto-optical interaction.

In this construction, the frequency shifts that develop in the signal components TE and TM on account of the acousto-optical interaction in the conversion stage, are expediently compensated for by oppositely directed shifts taking place in the compensation stage.

At the node 10, the primary ring line 2 comprises an input fiber 16 and an output fiber 17, the secondary ring line 3 comprising an input fiber 18 and output fiber 19. Furthermore, the network 1 includes local line optical fibers which comprise, at the node 10, a local input fiber 20 and local output fiber 21.

The node 10 also includes some directional switches. These switches have respective first and second inputs, and first and second outputs, and can either have a normal configuration, with their first output connected optically to the first input and their second output connected optically to the second input, or have a switched configuration whereby their first output is connected optically to the second input and their second output is connected optically to the first input. A directional switch can be fabricated with various different technologies. For example, it could be an electro-mechanical switch having operation times of a few tens of milliseconds; switches of this type are Model S-22NB-L-9 from DiCon Fiberoptics, Inc. and Model SW2:2X from JDS. Alternatively, a switch could be a magnetooptical type having operation times of a few milliseconds, such as Model YS-111 from FDK.

In particular, the following directional switches are provided at the node 10:
  a first working directional switch 22 having a first input 23, second input 24, first output 25 and second output 26;
  a second working directional switch 27 having a first input 28, second input 29, first output 30 and second output 31;
  a first backup directional switch 32 having a first input 33, second input 34, first output 35 and second output 36; and
  a second backup directional switch 37 having a first input 38, second input 39, first output 40 and second output 41.

The input fiber 16 of the primary ring line 2 is connected to the first input 23 of the first working directional switch 22. The output fiber 17 of the primary ring line 2 is connected to the first output 30 of the second working directional switch 27. The input fiber 18 of the secondary ring line 3 is connected to the second input 34 of the first backup directional switch 32. The output fiber 19 of the secondary ring line 3 is connected to the second output 41 of the second backup directional switch 37.

The local input fiber 20 is connected to the local input 14 of the wavelength-selecting optical switch 11. The local output fiber 21 is connected to the local output 15 of the wavelength-selecting optical switch 11.

The first output 25 of the first working directional switch 22 is connected to the first input 33 of the first backup directional switch 32 by a first connection fiber 42. The first output 35 of the first backup directional switch 32 is connected to the main input 12 of the wavelength-selecting optical switch 11 by a second connection fiber 43.

The main output 13 of the wavelength-selecting optical switch 11 is connected to the first input 3E of the second backup directional switch 37 by a third connection fiber 44. The first output 40 of the second backup directional switch 37 is connected to the first input 28 of the second working directional switch 27 by a fourth connection fiber 45.

The optical connection fibers 42, 43, 44 and 45 are parts of the primary ring line 2, along with the input fiber 16 and the output fiber 17.

The second output 36 of the first backup directional switch 32 is connected to the second input 24 of the first working directional switch 22 by a fifth connection fiber 47. The second output 26 of the first working directional switch 22 is connected to the second input 29 of the second working directional switch 27 by a sixth connection fiber 46. The second output 31 of the second working directional switch 27 is connected to the second input 39 of the second backup directional switch 37 by a seventh connection fiber 48.

The optical connection fibers 47, 46 and 48 are parts of the secondary ring line 3, along with the input fiber 18 and the output fiber 19.

The node 10 further includes control and actuation devices, known per se, which are effective to detect failures (i.e. signal interrupts) at the various optical elements and operate the directional switches.

The operation of the node 10 is the following.

In a normal operation of the network, signals come in through the input fiber 16, go through the first working directional switch 22 from the first input 23 to the first output 25 thereof, travel along the first connection line 42, and through the first backup directional switch 32 from the first input 33:; to the first output 35 thereof, travel along the: second connection line 43 and enter the wavelength-selecting optical switch 11 through its main input 12.

Within the wavelength-selecting optical switch 11, those signal components which have the predetermined wavelengths for the node 11 are routed toward the local output 15 and the local output fiber 21. Likewise, the signals are introduced components having the predetermined wavelengths via the local input fiber 20 and the local input 14. In other words, an exchange of information about the predetermined wavelength takes place within the wavelength-selecting optical switch 11.

The signals exit then the wavelength-selecting optical switch 11 through the main output 13, continue along the third connection fiber 44, go through the second backup directional switch 37 from the first input 38 to the first output 40 thereof, continue along the fourth connection fiber 45, go through the second working directional switch 27 from the first input 28 to the first output 30 thereof, and exit the node along the main output fiber 17.

Upon the occurrence of an interruption in the primary line 2, ahead or after the node 10, either the first working directional switch 22 or the second working directional switch 27 is operated.

In the instance of the interruption occurring ahead of the node 10, the signals will arrive through the input fiber 18 of the secondary line 3, instead of through the input fiber 16 of the primary line 2. The input signals then go through the first backup directional switch 32 from the second input 34 to the second output 36 thereof, continue along the fourth connection fiber 47, through the first working directional switch 22 (presently in a switched condition) from the second input 24 to the first output 25 thereof, and then continue (like in normal operation) along the first connection fiber 42, through the first backup directional switch 32 from the first input 33 to the first output 35 thereof, along the second connection fiber 43, and enter the wavelength-selecting optical switch 11 through its main input 12. The path from the wavelength-selecting optical switch 11 to the output fiber 17 is the same as in normal operation. Thus, the failure does not affect the operation of the node 10, and even less so the operation of the network as a whole.

On the contrary, should the interruption occur after the node 10, the signals are to be sent over the output fiber 19 of the secondary line 3, instead of the output fiber 17 of the primary line 2. Therefore, the input signals will follow the normal operation path from the input fiber 16 to the wavelength-selecting optical switch 11, and thence to the second working directional switch 27. Since the latter is in a switched state, the signals will go through it, from the first input 28 to the second output 31 thereof, and continue along the seventh connection fiber 48, through t he second backup directional switch 37, from the second input 39 to the second output 41 thereof, and continue along the output fiber 19.

It can be appreciated that, with a ring network, for each interruption in the main line, there will be a downstream node and an upstream node, and that one of the operations just described will be carried out in each of them.

This mode of operation reflects the operation of prior art nodes, such as that shown in FIG. 1.

If during one of the above-described actions a failure also occurs at the working directional switch that is to be operated, whereby its operation becomes impossible, with a prior art self-healing node as shown in FIG. 1 the transmission would be interrupted everywhere in the network, because the signals can go through neither the main line (interrupted at the line fiber) nor the protection line (not accessible due to the directional switch being inoperative).

On the contrary, with the node 10 of this invention, even such simultaneously occurring failures can be accommodated without significant breaks in the transmission of the signals.

In fact, should the interruption occur in the primary line 2 ahead of the node 10, and at the same time problems be encountered with the first working directional switch 22, the first backup directional switch 32 would change over to divert the signals directly toward the wavelength-selecting optical switch 11, bypassing the first working directional switch with the problem. The signals will therefore be travelling the following path: they come in over the input fiber 18, go through the first backup directional switch 32 (as switched) from the second input 34 to the first output 35 thereof, continue on the second connection fiber 43 and arrive to the wavelength-selecting optical commutator 11; from the wavelength-selecting optical commutator 11 to the exit fiber 17 the path is the same as in normal operation.

Similarly, in case of an interruption of the primary line 2 after the node 10 and simultaneous failure of the second working directional switch 27, the second backup directional switch 37 would change over to divert the signals directly towards the output fiber 19, bypassing the second working directional switch 27 with the problem. The path of the signals leaving the wavelength-selecting optical switch 11 is thus the following: they come in over the third connection fiber 44, go through the second backup directional switch 37 (as switched) from the first input 38 to the second output 41 thereof, and exit over the output fiber 19; from the input fiber 16 to the wavelength-selecting optical commutator 11, the path is the same as in normal operation.

In either of the above cases, the faulty working directional switches are to pass no signals, and accordingly, will cause no interruptions or other problems, irrespective of the nature of their malfunction.

It should be noted, that the node 10 can also cope to some extent with a possible failure at the wavelength-selecting optical switch 11, by simultaneously operating the first working directional switch 22 and second working directional switch 27. In this case, the network is kept operative, in the sense that the incoming signals from the input fiber 16 are re-routed to the sixth connection fiber 46 and thence to the output fiber 17, bypassing the faulty wavelength-selecting optical switch 11; it should be understood, however, that in this case a faulty wavelength-selecting optical switch 11 would inhibit the exchange of information at the node 10 over the local input fiber 20 and the local output fiber 21.

I claim:

1. An optical node in an optical signal transmission network of the self-healing ring type, wherein the ring comprises at least one primary ring line through which optical signals are propagated in a predetermined direction in the normal condition of operation and a secondary ring line through which the optical signals are propagated in the opposite direction upon the occurrence of a failure, comprising:

a unit for extracting and/or inserting an optical signal from/into the primary ring line, with the unit connected serially in said line;

first and second working directional switches connected serially in the primary ring line, respectively ahead of and after the extracting and/or inserting unit with respect to the direction of propagation of the optical signals through the primary ring line, and further connected serially in the secondary ring line, said switches being effective to controllably switch the optical signals between the primary ring line and the secondary ring line as well as to the extracting and/or inserting unit;

characterized in that it comprises first and second backup directional switches being respectively associated with the first and second working directional switches, and operatively connected in the primary and secondary ring lines to restore the optical node to proper operation on the occurrence of a failure at the first and second working directional switches.

2. An optical node according to claim 1, wherein the first and second backup directional switches are respectively connected after the first working directional switch and ahead of the second working directional switch along the primary ring line, and respectively connected ahead of the first working directional switch and after the second working directional switch along the secondary ring line.

3. An optical node according to claim 2, wherein:

the primary ring line includes at the node:
a node input fiber connected to a first input of the first working directional switch,
a first connection fiber connecting a first output of the first working directional switch to a first input of the first backup directional switch,
a second connection fiber connecting a first output of the first backup directional switch to a main input of the extracting and/or inserting unit,
a third connection fiber connecting a main output of the extracting and/or inserting unit to a first input of the second backup directional switch,
a fourth connection fiber connecting a first output of the second backup directional switch to a first input of the second working directional switch, and
a node output fiber connected to a first output of the second working directional switch;

the secondary ring line includes at the node:
a node input fiber connected to a second input of the first backup directional switch,
a fifth connection fiber connecting a second output of the first backup directional switch to a second input of the first working directional switch,
a sixth connection fiber connecting a second output of the first working directional switch to a second input of the second working directional switch,
a seventh connection fiber connecting a second output of the second working directional switch to a second input of the second backup directional switch, and
a node output fiber connected to a second output of the second backup directional switch.

4. A method of retaining, on the occurrence of a failure, the communication of optical signals within a self-healing ring type of optical transmission network having at least two insertion and/or extraction nodes controlled by optical signals, and two ring lines connecting said nodes, namely a primary ring line through which the optical signals propagate in a predetermined direction and a secondary ring line through which the optical signals would propagate in the opposite direction on the occurrence of a failure, the method comprising the following steps to be carried out in the event of the communication being interrupted at an identified site along the primary ring line:

switching the signals, at the downstream node from the interruption site with respect to the direction of propagation of the signals through the primary ring line, to re-route them from the secondary ring line to the primary ring line using a first working directional switch at the node input;

switching the signals, at the upstream node of the interruption site with respect to the direction of propagation of the signals through the primary ring line, to re-route them from the primary ring line to the secondary ring line using a second working directional switch at the node output;

characterized in that, in the event of a further failure occurring all any one of the working switches, the following step is carried out:

re-routing the signals directed to the faulty working directional switch from the ring line through which they were propagating, to the other ring line before the signals enter the faulty working directional switch.

5. A method according to claim 4, comprising, on the occurrence of a failure at the input working directional switch, the step of switching the signals from the secondary ring line to re-route them to the primary ring line, before the signals enter the faulty input working directional switch.

6. A method according to claim 4, comprising, on the occurrence of a failure at the output working directional switch, the step of switching the signals from the primary ring line to re-route them to the secondary ring line, before the signals enter the faulty output working directional switch.

7. An optical node in an optical signal transmission network having a primary line and a secondary line, comprising:

a unit serially connected in the primary line for inserting signals in and extracting signals from the primary line;

first and second working directional switches serially connected to the primary line and to the secondary line; and first and second backup directional switches serially connected to the primary line and to the secondary line, wherein when the primary line is interrupted and when one of the first and second working directional switches fails, one of the first and second backup directional switches causes the failed directional switch to be bypassed.

8. The optical node as in claim 7, wherein when the first working directional switch fails, the first backup directional switch causes the first working directional switch to be bypassed.

9. The optical node as in claim 7, wherein when the second working directional switch fails, the second backup directional switch causes the second working directional switch to be bypassed.

\* \* \* \* \*